US008576040B2

(12) United States Patent
Kim et al.

(10) Patent No.: US 8,576,040 B2
(45) Date of Patent: Nov. 5, 2013

(54) MULTILAYER TYPE POWER INDUCTOR

(75) Inventors: Myeong Gi Kim, Gyeonggi-do (KR); So Yeon Song, Gyeonggi-do (KR); Ic Seob Kim, Gyeonggi-do (KR); Sung Yong An, Gyeonggi-do (KR); Jin Woo Hahn, Gyeonggi-do (KR); Soo Hwan Son, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/237,272

(22) Filed: Sep. 20, 2011

(65) Prior Publication Data

US 2012/0268230 A1 Oct. 25, 2012

(30) Foreign Application Priority Data

Apr. 25, 2011 (KR) ........................ 10-2011-0038604

(51) Int. Cl.

| | |
|---|---|
| ***H01F 5/00*** | (2006.01) |
| ***H01F 27/28*** | (2006.01) |
| ***H01F 17/00*** | (2006.01) |
| ***C04B 35/00*** | (2006.01) |

(52) U.S. Cl.

USPC ............ 336/200; 336/177; 336/232; 501/134

(58) Field of Classification Search

USPC ................. 336/200, 205, 207, 208, 232, 177; 501/134, 135

See application file for complete search history.

(56) References Cited

U.S. PATENT DOCUMENTS

| | | | | |
|---|---|---|---|---|
| 6,228,196 | B1 * | 5/2001 | Sakamoto et al. | 156/89.17 |
| 6,249,205 | B1 * | 6/2001 | Meadors et al. | 336/200 |
| 6,362,012 | B1 * | 3/2002 | Chi et al. | 438/3 |
| 6,486,529 | B2 * | 11/2002 | Chi et al. | 257/531 |
| 7,124,498 | B2 * | 10/2006 | Sato | 29/603.13 |
| 7,145,427 | B2 * | 12/2006 | Yoshida et al. | 336/200 |
| 7,160,406 | B2 * | 1/2007 | Hoffmann et al. | 156/89.12 |
| 7,436,644 | B2 * | 10/2008 | Nagai et al. | 361/160 |
| 7,605,682 | B2 * | 10/2009 | Nakao et al. | 336/200 |
| 7,889,044 | B2 * | 2/2011 | Ueda et al. | 336/200 |
| 8,004,383 | B2 * | 8/2011 | Konoue et al. | 336/200 |
| 8,330,568 | B2 * | 12/2012 | Konoue et al. | 336/233 |
| 2011/0095856 | A1 * | 4/2011 | Nakajima et al. | 336/177 |

FOREIGN PATENT DOCUMENTS

| | | | |
|---|---|---|---|
| JP | 2005-116887 | A | 4/2005 |
| JP | 2006-216916 | A | 8/2006 |
| JP | 2006-339532 | A | 12/2006 |
| JP | 2010-153616 | A | 7/2010 |
| KR | 2009-0080128 | A | 7/2009 |
| WO | WO-2009/136661 | A1 | 11/2009 |
| WO | WO 2009136661 | A1 * | 11/2009 |

OTHER PUBLICATIONS

Korean Office Action issued in Korean Patent Application No. 10-2011-0038604 dated Nov. 29, 2012.

* cited by examiner

*Primary Examiner* — Lincoln Donovan
*Assistant Examiner* — Joselito Baisa
(74) *Attorney, Agent, or Firm* — McDermott Will & Emery LLP

(57) ABSTRACT

Disclosed herein is a multilayer type power inductor including: a plurality of body layers including internal electrodes and having magnetic material layers stacked therein; and a plurality of gap layers, wherein the gap layer has an asymmetrical structure. In the multilayer type power inductor, portions that are in contact with the body layers have, a non-porous structure, which is a dense structure, and portions that are not in contact with the body layers have a porous structure, such that the gap layer has the asymmetrical structure. Therefore, a magnetic flux propagation path in a coil is dispersed to suppress magnetization at a high current, thereby making it possible to improve a change in inductance (L) value according to the application of current.

11 Claims, 7 Drawing Sheets

- PRIOR ART -

MULTILAYER TYPE POWER INDUCTOR

CROSS REFERENCE(S) TO RELATED APPLICATIONS

This application claims the benefit under 35 U.S.C. Section 119 of Korean Patent Application Serial No. 10-2011-0038604, entitled “Multilayer Type Power Inductor” filed on Apr. 25, 2011, which is hereby incorporated by reference in its entirety into this application.

BACKGROUND OF THE INVENTION

1. Technical Field

The present invention relates to a multilayer type power inductor, and more particularly, to a multilayer type power inductor having improved temperature characteristics by including a gap layer having an asymmetrical structure.

2. Description of the Related Art

A multilayer type power inductor is mainly used in a power supply circuit such as a DC-DC converter within a portable device. A multilayer type power inductor having a small size, a high current, a low DC resistance, or the like, has been mainly developed. In accordance with the trend for a DC-DC converter having a high frequency and a small size, the use of the multilayer type power inductor instead of the existing wire-wound type choke coil according to the related art has increased.

In the case of the multilayer type power inductor, magnetic saturation of the inductor is materially/structurally suppressed, such that the inductor may be used at a high current. The multilayer type power inductor has a disadvantage in that a change in inductance (L) value according to the application of current thereto is larger; however, has an advantage in that it has a smaller size and a thinner thickness and is also advantageous in terms of a DC resistance, as compared to the wire-wound type power inductor (See FIG. 1).

A power inductor having a small change in inductance value with respect to a used current has been required. Particularly, a power inductor capable of being operated from a low temperature of −55° C. to a high temperature of +125° C. and having a small change in inductance value with respect to a temperature has been increasingly required.

Particularly, the wire-wound type power inductor has a small change in inductance (L) value according to the application of current thereto. Also in the multilayer type power inductor, an effort for implementing the small change in inductance (L) value according to the application of current has been conducted. For this, it has been shown that factors such as a composition of a material, a micro-structure, a structural design, or the like, are important. In other words, the multilayer type power inductor has a disadvantage in that a change in inductance (L) values according to the application of current thereto is larger, as compared to the wire-wound type power inductor. This is the reason that the wire-wound type power inductor has structurally a larger open magnetic path effect.

Therefore, in the multilayer type power inductor, it is important to improve change characteristics in inductance (L) value according to the application of current. Currently, a gap layer has been partially included in an inner structure of the multilayer type power inductor to cut a magnetic flux, thereby improving the change characteristics in inductance (L) value according to the application of current. On the other hand, the multilayer type power inductor has a simple structure, a small size, and a thin thickness, and is advantageous in securing price competitiveness.

A structure of a general multilayer type power inductor that is currently being used is shown in FIG. 2. Referring to FIG. 2, internal electrodes 10 are formed and a gap layer 30 is inserted into a body 20 made of a ferrite material to block a magnetic flux, thereby decreasing a change in inductance value according to the application of current. Then, firing is performed at a temperature of about 900° C., external electrodes 40 are formed, and plating is then performed, such that a plating layer 50 is formed.

However, this multilayer type power inductor has a disadvantage in that a change in inductance value according to the application of current thereto is large according to a change in temperature, such that temperature stability is low. This is the reason that temperature characteristics change due to diffusion according to a temperature because copper (Cu)-substituted Zn-ferrite is used as a non-magnetic material, which is a material of the gap layer.

The basic concept of design for the multilayer type power inductor is that even though the efficiency of a coil decreases, change characteristics in inductance value according to the application of current (hereinafter, DC bias characteristics) is allowed to be improved, such that a change in inductance (L) value according to the application of current is maximally suppressed.

The smaller the change in inductance (L) value the application of current is, the more excellent the DC bias characteristics become. The lower the inductance (L) value is, the larger the ripple of an output voltage becomes and the lower the efficiency becomes. The lower a DC resistance is, the higher the efficiency becomes. Particularly, the efficiency becomes high at a high current. Changes in inductance (L) value according to the application of current at each temperature are measured. In this case, it is preferable that the change in inductance (L) value according to the application of current at each temperature is small.

The DC-bias characteristics of a chip inductor are a function of characteristics of a material and a coil structure. First, in the case of materials having the same-magnetic permeability, the higher the saturation magnetization (Ms) of the material is, the more excellent the DC-bias characteristics may become. Therefore, basically, a material having excellent DC-bias characteristics need to be selected at the time of selection of a composition. There is also a need to consider a grain size. Generally, the DC-bias characteristics are excellent at a small grain size. Since density of a material itself and density of an electronic spin are in proportion to each other, it is also necessary to decrease pores of the material in order to improve the DC-bias characteristics.

Meanwhile, the DC-bias characteristics of the material may change according to a magnetic permeability. That is, the lower the magnetic permeability is, the more excellent the DC-bias characteristics may become. However, the turn number of the coil need to be increased in order to implement the same inductance. In this case, since a magnetic flux flowing in the coil increases, an effect in which the magnetic saturation of the material is delayed decreases by half.

Whether or not there is really a merit in this case may be predicted from a magnetic circuit equation. For convenience, it is assumed that a change rate in material according to the magnetic saturation corresponds to a function of a magnetic flux. The following Equation 1 is obtained from the magnetic circuit equation.

$$L = \frac{N^2}{R_f} \quad \text{[Equation 1]}$$

In Equation 1, L indicates an inductance value, N indicates the turn number of the coil, and Rf indicates a resistance value of ferrite.

Since Rf increases when the magnetic permeability is different, capacitance need to be adjusted by increasing the turn number (N).

When magnetic resistance values in a high magnetic permeability coil (Coil 1) in a structure shown in FIG. 3A and a low magnetic permeability coil (Coil 2) in a structure shown in FIG. 3B are expressed as $R_1$ and $R_2$ and variables according to a change in structure are expressed as $N_1$ and $N_2$, the following Equation 2 is obtained.

$$L = \frac{N_1^2}{R_1} = \frac{N_2^2}{R_2} \rightarrow R_2 = \left(\frac{N_2}{N_1}\right)^2 R_1 \quad \text{[Equation 2]}$$

On the other hand, a magnetic flux flowing in a material itself is a function of the turn number and the magnetic resistance value. Therefore, magnitudes of the magnetic fluxes in each of the structures may be compared with each/other from the following Equation 3.

$$\phi_1 = \frac{NI}{R_1} \quad \text{[Equation 3]}$$

$$\phi_2 = \frac{N_2 I}{R_2} = \frac{N_2 I}{R_1}\left(\frac{N_1}{N_2}\right)^2 = \frac{N_1 I}{R_1} \cdot \left(\frac{N_1}{N_2}\right) = \phi_1 \cdot \left(\frac{N_1}{N_2}\right)$$

Since $N_1 < N_2$, the magnetic flux flowing in the Coil 2 is actually smaller than the magnetic flux flowing in the Coil 1. Therefore, it is predicted that a change rate in magnetic permeability will be smaller and DC-bias characteristics will be more excellent in the Coil 2 than in the Coil 1.

In a multilayer type power inductor having a gap layer inserted thereinto as shown in FIG. 4, an effect of the gap layer will be described. When a magnetic material structure of a magnetic circuit is cut by a non-magnetic material or an air gap, a magnetic resistance increases, such that a magnitude of a magnetic flux flowing in the magnetic circuit decreases. Therefore, an effective magnetic permeability decreases, and an inductance decreases accordingly. However, a change in inductance (L) value becomes significantly small. This influence is expressed by the following Equation 4.

$$\frac{\Delta L_e}{L_e} \approx \frac{\Delta \mu_r}{\mu_r}\left(\frac{\mu_e}{\mu_r}\right)^2 \quad \text{[Equation 4]}$$

Therefore, when the effective magnetic permeability decreases by the gap layer made of the non-magnetic material, the DC-bias characteristics are improved by square of the effective magnetic permeability.

When there is the gap layer, the inductance may be expressed by the following Equation 5.

$$L = \frac{N^2}{R_g + R_f} \quad \text{[Equation 5]}$$

In Equation 5, Rg indicates a magnetic resistance of the gap layer and Rf indicates a magnetic resistance of the ferrite.

Here, when the coil is perfectly designed and a cross sectional area in a magnetic flux path is constant, a relationship between a magnetic permeability and a magnetic resistance of the ferrite may be expressed by the following Equation 6 and Equation 7.

$$R_f = \frac{l_e}{\mu_r \mu_o S_e} = \frac{A}{\mu_r} \quad \text{[Equation 6]}$$

$$L = \frac{N^2}{R_g + A/\mu_r} \quad \text{[Equation 7]}$$

In Equation 6 and Equation 7, le indicates an effective path of the magnetic flux, Se indicates an effective cross sectional area of the magnetic flux, and A is a constant.

Therefore, in the case of the general inductor, a change in inductance value is in direct proportion to the magnetic permeability; however, in the case of the inductor including the gap layer, Rg is significantly larger than Rf, such that a change in magnetic permeability does not significantly have an influence on the inductance.

As described above in detail, the power inductor has the gap layer inserted thereinto, such that the DC-bias characteristics of the power inductor may be significantly improved.

However, when the power inductor is actually used, the DC-bias characteristics according to a change in temperature (hereinafter, referred to as Bias-TCL) as well as the DC-bias characteristics at a room temperature need to be excellent.

FIG. 5A shows a case in which a change in inductance value is significantly small after currents measured at each temperature are applied; and FIG. 5B shows a case in which bias-TCL characteristics according to a temperature are deteriorated. When the power inductor has the deteriorated DC-bias characteristics as shown in a graph of FIG. 5B, it is difficult to use the power inductor in a DC-DC converter.

The bias-TCL according to a temperature is in correlation with a kind of material used in the gap layer. As a material of the existing gap layer, ZnCu-ferrite in which ZnO is substituted with a small amount of CuO in Zn-ferrite ($ZnFe_2O_4$) is used. Since the material of the gap layer is the non-magnetic material, it is preferable that ferrite having a significantly low Curie temperature to thereby have non-magnetism at a room temperature is appropriate to be used as the material of the gap layer. For example, the Zn-ferrite ($ZnFe_2O_4$) is appropriate to be used as the material of the gap layer because it has a significantly low Curie temperature of 35 K or less.

However, there is a disadvantage in that it is difficult to sinter the Zn-ferrite at a temperature of 900° C. or less. Generally, in the multilayer type power inductor, silver (Ag) is used as a material of an internal electrode. Since the silver has a melting point of 961° C., sintering need to be performed at a temperature of about 900° C. However, the Zn-ferrite is not well sintered at the temperature of about 900° C. Therefore, in order to improve sinterability, ZnO is substituted with a small amount of CuO in Zn-ferrite ($ZnFe_2O_4$) in the Zn-ferrite, such that the sintering may be performed at the temperature of about 900° C.

In addition, since ZnCu ferrite has a spinel structure in which it does not have a lattice mismatch with NiZnCu ferrite used as a material of the body, it may decrease delamination that may be generated at the time of sintering of the multilayer type power inductor.

However, the ZnCu ferrite is not a complete non-magnetic material, has a Curie temperature of a room temperature or less, and shows non-magnetic material characteristics at the room temperature. However, a thickness of the non magnetic material decreases due to the diffusion of Ni and Cu at the time of firing (See FIG. 6).

In addition, as shown in FIG. 6, Ni is diffused to the gap layer and enters the gap layer at the time of firing and positions to which Ni is diffused have magnetism, such that the entire thickness of the gap layer made of the non-magnetic material decreases. The decrease in thickness of the gap layer is generated because positions having different Curie temperatures according to a temperature are generated, such that a thickness of the gap layer made of the non-magnetic material according to the temperature changes as shown in FIG. 7.

When the thickness of the gap layer made of the non-magnetic material increases, the DC-bias characteristics are improved, and when it decreases, the DC-bias characteristics are deteriorated. Therefore, in order to use the ferrite non-magnetic material, a gap layer capable of suppressing this diffusion is needed. Mutual diffusion between the magnetic material ferrite of the body and the non-magnetic material ferrite is generated, thereby making it possible to deteriorate characteristics of the power inductor.

Meanwhile, the power inductor according to the related art is the multilayer type power inductor having a structure as shown in FIG. 4 and is made of a ferrite sheet. Here, NiZnCu ferrite having ferrimagnetism is used as a material of the body.

Non-magnetic material ferrite (generally, ZnCu ferrite) having ferrimagnetism is used in the entire surface sheet gap or an open sheet gap as a material of the gap layer. Firing is performed at a temperature of about 900° C., external electrodes are formed, and plating is then performed.

However, the multilayer type power inductor according to the related art in which the gap layer is made of the ZnCu ferrite has the following problems.

(1) An Ni component contained in the NiZnCu ferrite, which is a material of the body, is diffused into the gap layer and a Zn component of the gap layer is diffused into the body, such that a thickness of the gap layer made of the non-magnetic material decreases. When the thickness of the gap layer made of the non-magnetic material decreases, the DC-bias characteristics may be deteriorated.

Therefore, since the thickness of the gap layer made of the non-magnetic material need to be increased in order to improve the DC-bias characteristics, a gap sheet inserted before sintering need to have a thick thickness. However, when the gap sheet having the thick thickness is used, a thickness (at direction) of the multilayer type power inductor increases.

(2) A predetermined level of magnetic flux is blocked; however, there is a risk of delamination due to a difference in contraction percentage between the ZnCu ferrite and the ferrite material of the body at the time of sintering and stress may be generated in an inner portion of the power inductor.

(3) The bias-TCL characteristics are deteriorated due to the diffusion of the gap layer.

SUMMARY OF THE INVENTION

An object of the present invention is to provide a multilayer type power inductor in which bias-TCL characteristics according to a change in temperature may be improved, a risk of delamination between a gap layer and a body layer may be reduced, and a change in inductance (L) value according to the application of current may be improved.

According to an exemplary embodiment of the present invention, there is provided a multilayer type power inductor including: a plurality of body layers including internal electrodes and having magnetic material layers stacked therein; and a plurality of gap layers, wherein the gap layer has an asymmetrical structure.

Surfaces that are in contact with the plurality of body layers may have a non-porous structure in which they do not include pores formed therein and surfaces that are not in contact with the plurality of body layers may have a porous structure, such that the gap layer may have the asymmetrical structure.

The gap layer may be a non-magnetic material layer.

The non-porous structure in which the pores do not exist in the gap layer may have a thickness of 0.1 to 3 μm.

The internal electrode may be made of at least one selected from a group consisting of Ag, Sn, Ni, Pt, Au, Cu, and an alloy thereof.

The body layer may be made of NiZnCu ferrite.

The body layer may further contain at least one additive within 0.2 mol %, which is selected from a group consisting of $Bi_2O_3$, CoO, and $TiO_2$, based on 100 mol % of NiZnCu ferrite.

The gap layer may be made of at least one non-magnetic material selected from a group consisting of tetravalent metal oxides.

The tetravalent metal may be at least one selected from a group consisting of Ti, Zr, and Sn.

The gap layer may further contain additives.

The additives may include 0.001 to 0.05 mol % of CuO, 0.001 to 0.1 mol % of ZnO, 0.001 to 1 mol % of $Fe_2O_3$, and 0.001 to 0.01 mol % of $Bi_2O_3$ based on 100 mol % of the tetravalent metal oxide.

The multilayer type power inductor may have a change rate in inductance value within 10% in a temperature range of −50 to 125° C. when there is no bias.

DESCRIPTION OF THE PREFERRED EMBODIMENTS

Hereinafter, the present invention will be described in more detail.

The present invention relates to a multilayer type power inductor having excellent characteristics according to a change in temperature by including a gap layer having an asymmetrical structure.

Figure 1:
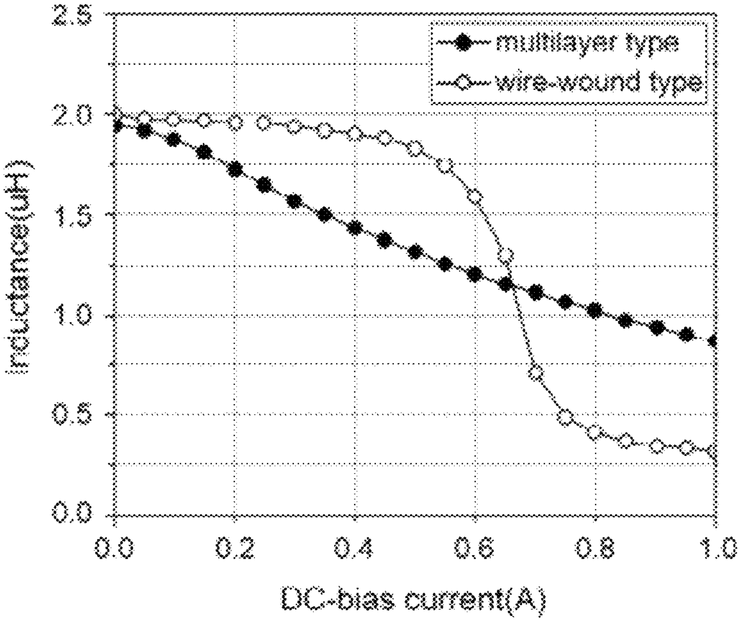
FIG. 1 is a graph showing a change in inductance value according to the application of a direct current (DC) current to a multilayer type power inductor and a wire-wound type power inductor.
Figure 2:
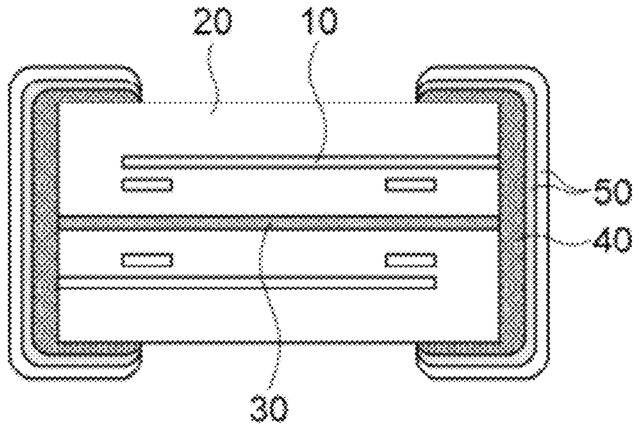
FIG. 2 is a view showing a structure of a general multilayer type power inductor.
Figure 3A:
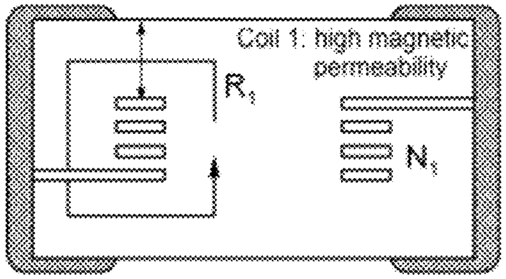
FIG. 3A is a view showing a structure of a chip inductor made of a high magnetic permeability material (Coil 1)
Figure 3B:
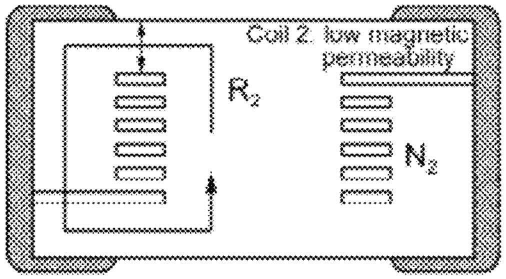
FIG. 3B a view showing a structure of a chip inductor made of a low magnetic permeability material (Coil 2)
Figure 4:
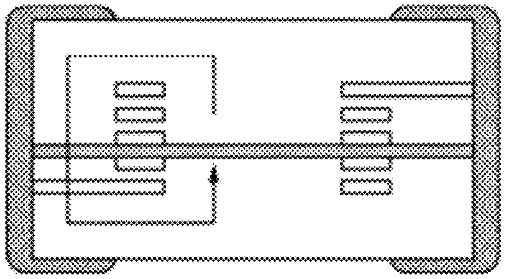
FIG. 4 is a conceptual view of a multilayer type power inductor including a gap layer.
Figure 5A:
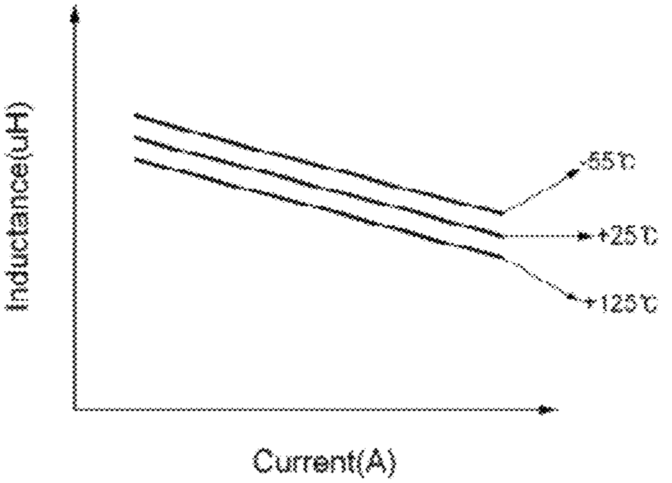
FIGS. 5A and 5B are views showing examples of bias-TCL characteristics.
Figure 5B:
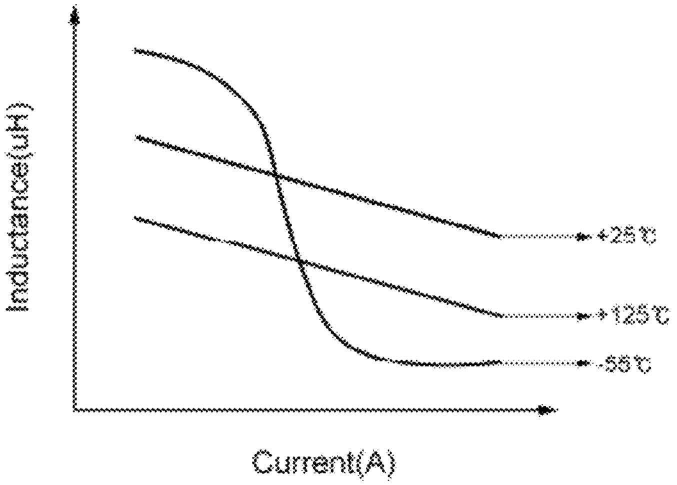
Figure 6:
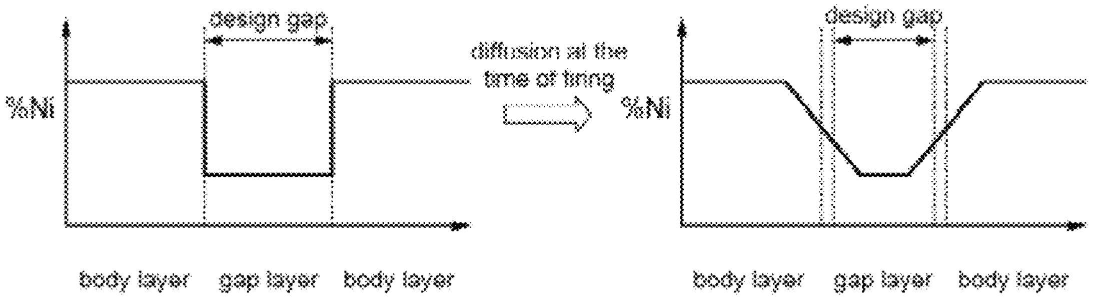
FIG. 6 is a view showing a model for diffusion in the vicinity of a gap layer of a multilayer type power inductor at the time of firing.
Figure 7:
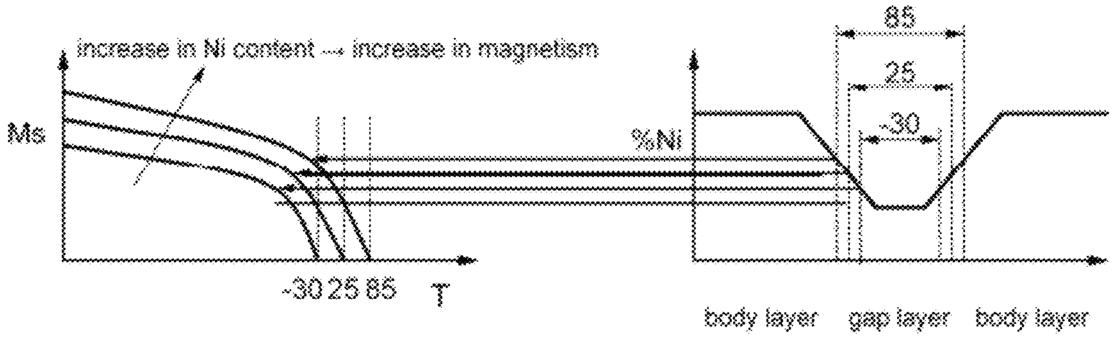
FIG. 7 is a view showing a model for a relationship between a temperature and an increase in Ni content by diffusion at the time of firing.
Figure 8:
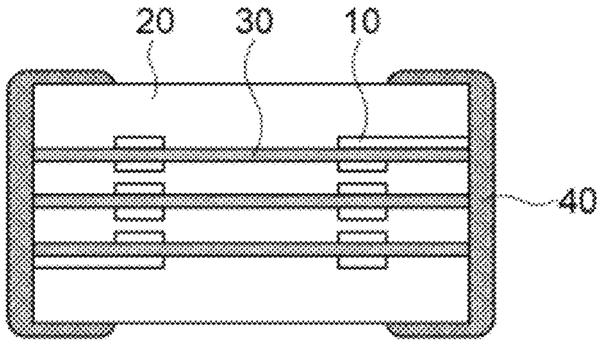
FIG. 8 is a view showing a structure of a multilayer type power inductor according to an exemplary embodiment of the present invention.

FIG. 8 is a view showing a structure of a multilayer type power inductor according to the present invention. The a multilayer type power inductor includes' a plurality of body layers 20 including internal electrodes 10 and having magnetic material layers stacked therein, and a plurality of gap layers 30, wherein the gap layer 30 has an asymmetrical structure.

In the gap layer 30 included in the multilayer type power inductor according to the present invention, surfaces that are in contact with the plurality of body layers 20 may have a non-porous structure 31 in which they do not include pores formed therein and surfaces that are not in contact with the plurality of body layers 20 may have a porous structure 32, as shown in FIG. 9.

As shown in FIG. 9, the non-porous structure 31 formed in the gap layer 30 according to the present invention serves as a separately distinguished layer between the body layer 20 and the gap layer 30 to thereby act as a connection layer connecting the body layer and the gap layer to each other. If there is no the non-porous structure 31, delamination between the body layer 20 and the gap layer 30 in a stacked structured is frequently generated.

The gap layer according to the present invention may be made of at least one non-magnetic material selected from a group consisting of tetravalent metal oxides. Here, the tetravalent metal may be at least one selected from a group consisting of Ti, Zr, and Sn.

The tetravalent metal may have an anatase structure or a rutile structure; however, is not specifically limited to the above-mentioned structures.

In addition, the gap layer may further contain additives in addition to the tetravalent metal oxide. More specifically, the gap layer may contain 0.001 to 0.05 mol % of CuO, 0.001 to 0.1 mol % of ZnO, 0.001 to 1 mol % of $Fe_2O_3$, and 0.001 to 0.01 mol % of $Bi_2O_3$ based on 100 mol % of the tetravalent metal oxide.

In addition, it is obvious to those skilled in the art that the additives may be added in a glass form or a small amount of other elements may be added if they do not damage physical properties of the gap layer.

Generally, the lower the magnetic permeability is, the excellent the DC-bias characteristics of a material may become. Therefore, a material having low magnetic permeability may be used as a main component of the gap layer. However, in the case of using only the material having low magnetic permeability, sinterability may be deteriorated. Therefore, in the present invention, the above-mentioned gap layer compositions may be used in consideration of the magnetic permeability and the sinterability. In addition, since the existing ZnCu ferrite having non-magnetic characteristics is not used, a problem generated in this copper-containing ferrite may be solved.

Since the gap layer according to the present invention contains only a small amount of copper oxide, a problem that characteristics of the power inductor according to a change in temperature are deteriorated due to the use of a large amount of copper-substituted Zn-ferrite in the gap layer composition according to the related does not occur.

A portion of the tetravalent metal oxides and the additives contained the gap layer compositions and components used in the body layer are partially diffused to thereby form the non-porous structure and the porous structure, such that the gap layer according to the present invention has the asymmetrical structure as described above.

When the gap layer does not have the asymmetrical structure of the non-porous structure and the porous structure as described in the present invention but has only the porous structure as described in the general case according to the related art, a lattice constant and a lattice structure between the ferrite used in the body layer and having a spinel structure and the tetravalent metal used in the gap layer and having the rutile structure (or the anatase structure) are different, such that a mismatch therebetween is generated. However, in the present invention, the gap layer includes the non-porous structure having a lattice constant and a lattice structure similar to those of the ferrite used in the body layer and having the spinel structure, thereby making it possible to solve a problem that the mismatch is generated.

Therefore, the power inductor according to the present invention including the gap layer having the asymmetrical structure may have improved temperature characteristics, increased capacitance, and improved DC-bias characteristics. In addition, in order to decrease a change in inductance (L) value according to the application of current, a magnetic flux in the coil may be dispersed and blocked and the delamination due to the gap layer may be prevented.

In the present invention, the non-porous structure 31 in the gap layer 30 may have a thickness of 0.1 to 3 μm. When the non-porous structure 31 has a thickness less than 0.1 μm, coupling force between the gap layer and the body layer is weak, such that the delamination may be generated, and when it has a thickness more than 3 μm, the gap layer, which is the non-magnetic material layer, has an excessively thick thickness, such that a capacitance value and a quality factor (Q) value become small.

In addition, it may be appreciated that in the structure of the gap layer 30 according to the present invention, the surfaces that are not in contact with the plurality of body layers have the porous structure 32 in which they do not include a plurality of pores formed therein. These pores serve as an air gap to thereby improve the DC-bias characteristics.

The internal electrode is made of at least one selected from a group consisting of Ag, Sn, Ni, Pt, Au, Cu, and an alloy thereof, most preferably, Ag.

In addition, the body layer may be made of NiZnCu ferrite.

Further, the body layer may additionally contain at least one additive within 0.2 mol %, which is selected from a group consisting of $Bi_2O_3$, CoO, and $TiO_2$, based on 100 mol % of NiZnCu ferrite.

The multilayer type power inductor manufactured according to the present invention has a change rate in inductance value within 10% in a temperature range of −50 to 125° C. when there is no bias.

Hereinafter, the multilayer type power inductor according to the present invention will be described in detail with reference to the following Inventive Example; however, the present invention is not limited to the following Inventive Example.

Inventive Example 1

A gap layer composition according to the present invention was prepared by adding 0.001 mol % of CuO, 0.001 mol % of ZnO, 0.001 mol % of $Fe_2O_3$, and 0.001 mol % of $Bi_2O_3$ based on 100 mol % of $TiO_2$ raw material.

A multilayer type power inductor including a gap layer made of the gap layer composition and having the structure as shown in FIG. 8 was manufactured.

Ag was used as a material of an internal electrode and the body layer was formed by adding at least one additive within 0.2 mol %, which is selected from a group consisting of $Bi_2O_3$, CoO, and $TiO_2$, based on 100 mol % of NiZnCu ferrite thereto.

The multilayer type power inductor according to the present invention has a structure in which three sheets of gap layers (15 μm) are formed between the body layers.

Comparative Example 1

A gap layer composition was prepared by using ZnCu ferrite as a main component of the gap layer.

In addition, the same components as the components in Inventive Example 1 were used as components of a body layer and three sheets of gap layers (20 μm) made of ZnCu ferrite were formed between the body layers.

Experimental Example 1

Structure Confirmation

Structures of the gap layers and the body layers of the multilayer type power inductors manufactured according to Inventive Example 1 and Comparative Example 1 were observed using a scanning electron microscopy (SEM). Results of the observation were shown in FIGS. 9A to 9C and 10.

Figure 9A:
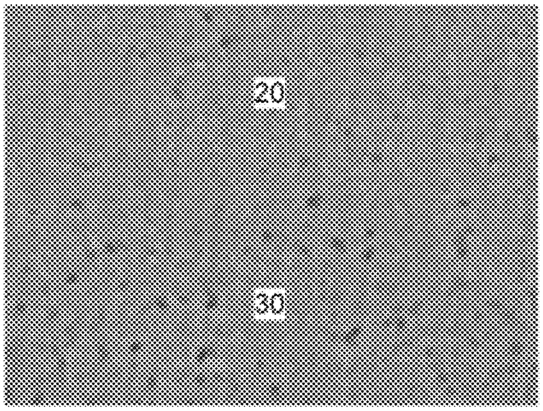
FIG. 9A is a scanning electron microscopy (SEM) photograph of a gap layer and a body layer of a multilayer type power inductor according to Comparative Example 1.

In the case of FIG. 9A according to Comparative Example 1 in which the existing ZnCu ferrite is used as the material of the gap layer, the gap layer and the body layer are separately formed. However, it was confirmed from an actual SEM photograph that the gap layer 30 and the body layer 20 are almost not distinguished from each other.

Figure 9B:
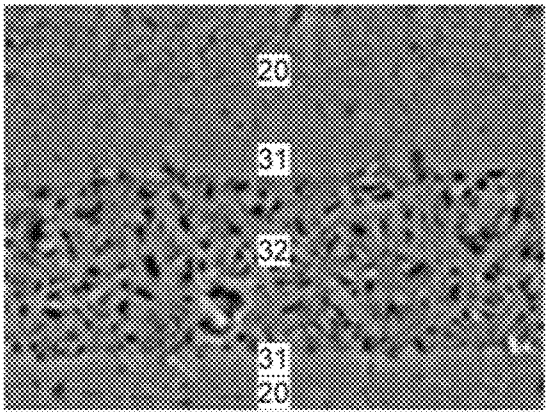
FIG. 9B is scanning electron microscopy (SEM) photograph of a gap layer and a body layer of a multilayer type power inductor according to Inventive Example 1.
Figure 9C:
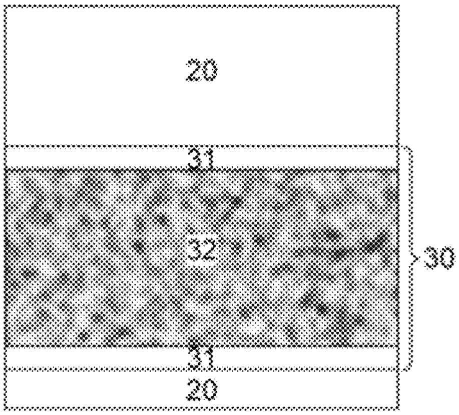
FIG. 9C is a view of a gap layer and a body layer of a multilayer type power inductor according to Inventive Example 1.

However, it may be confirmed from FIG. 9B that the gap layer 30 formed according to the present invention has the non-porous structure 31 at portions at which it is in contact with the body layer 20 and the porous structure 32 at portions at which it is not in contact with the body layer 20, that is, the gap layer has the asymmetrical structure. In addition, it may be confirmed from FIG. 9C that the body layer 20 and the gap layer 30 having the asymmetrical structure are clearly distinguished from each other. In addition, it was confirmed that the non-porous structure has a thickness of about 3 μm.

Figure 10:
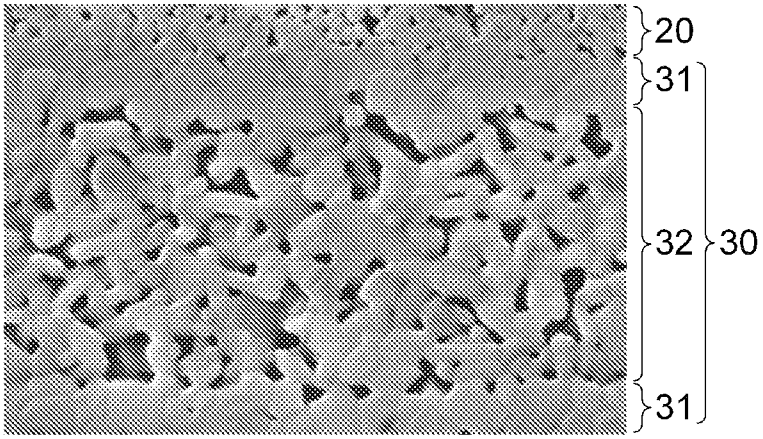
FIG. 10 is an enlarged SEM photograph of FIG. 9B.

In addition, it may be confirmed from FIG. 10, which is an enlarged view of FIG. 9B, that the gap layer 30 according to the present invention has the asymmetrical structure of the non-porous structure 31 and the porous structure 32 and is clearly distinguished from the body layer 20.

Experimental Example 2

Bias-TCL Characteristics Confirmation

Bias-TCL characteristics of the multilayer type power inductors manufactured according to Inventive Example 1 and Comparative Example 1 were confirmed. Results of the confirmation were shown in FIGS. 11 and 12.

The upper limit of the inductance value of the bias-TCL of each of the multilayer type power inductors manufactured according to Inventive Example 1 and Comparative Example 1 was about 6 μH and each of the bias-TCL characteristics was confirmed based on an inductance value of 2.25 μH at 0.5 A.

Figure 11:
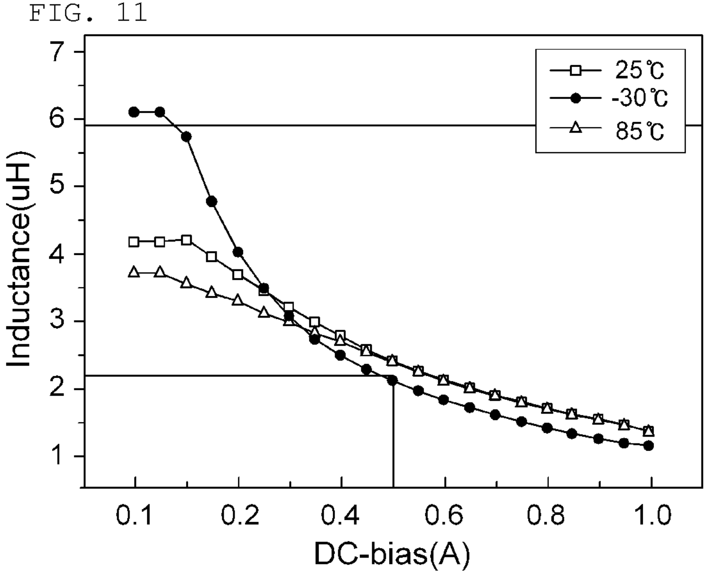
FIG. 11 is a graph showing bias-TCL characteristics of a multilayer type power inductor manufactured according to Comparative Example 1.
Figure 12:
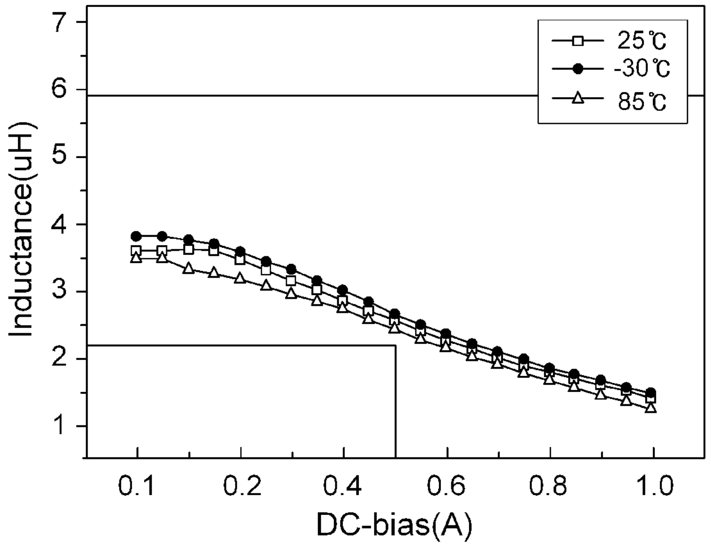
FIG. 12 is a graph showing bias-TCL characteristics of a multilayer type power inductor manufactured according to Inventive Example 1.

In the case of the multilayer type power inductor manufactured according to Comparative Example 1, it may be confirmed that the bias-TCL characteristics are significantly different according to a temperature, as shown in FIG. 11. That is, it may be confirmed that initial inductance values have a significant difference according to a temperature. In addition, it may be confirmed that the inductance value rapidly changes as the DC-bias is applied. Particularly, it may be confirmed that this phenomenon is intensified at a low temperature of −30° C. This is the reason that the components used as the gap layer composition according to the related art and the components used in the body layer were diffused into each other to thereby lower temperature characteristics.

However, it may be confirmed from a graph (FIG. 12) showing the bias-TCL characteristics of the multilayer type power inductor manufactured according to Inventive Example 1 that there is no difference among the characteristics even though the temperature changes. That is, it may be confirmed that the multilayer type power inductor according to the present invention has a significantly low change rate in inductance value within 10% in a temperature range of −50 to 125° C. when there is no bias. This is the reason that the gap layer was changed so as to have the asymmetrical structure to thereby effectively limit diffusion of non-desired components between the gap layer and the body layer.

In addition, the multilayer type power inductors according to Inventive Example 1 and Comparative Example 1 had the same number (three) of stacks; however, three sheets of gap layers made of ZnCu ferrite and having a thickness of 20 μm were used in the case of the multilayer type power inductors according to Comparative Example 1 and three sheets of gap layers containing $TiO_2$ and having a thickness of 15 μm were used in the case of the multilayer type power inductors according to Inventive Example 1. As a result, it may be confirmed that the entire thickness of the gap layer is thinner in the multilayer type power inductors according to Inventive Example 1 than in the multilayer type power inductors according to Comparative Example 1. It is generally known that the bias-TCL characteristics become worse as a thickness of the gap layer, which is the non-magnetic layer, becomes thin. However, it may be confirmed from FIG. 12 that even though the thickness of the gap layer is thinner in the multilayer type power inductors according to Inventive Example 1 than in the multilayer type power inductors according to Comparative Example 1, the bias-TCL characteristics are more excellent in the multilayer type power inductors according to Inventive Example 1 than in the multilayer type power inductors according to Comparative Example 1. As a result, it is possible to reduce the thickness of the chip simultaneously with improving the bias-TCL characteristics of the multilayer type power inductor.

According to the present invention, in the multilayer type power inductor, portions that are in contact with the body layers have a dense structure and portions that are not in contact with the body layers have a porous structure, such that the gap layer has the asymmetrical structure. Therefore, a magnetic flux propagation path in a coil is dispersed to suppress magnetization at a high current, thereby making it possible to improve a change in inductance (L) value according to the application of current. In addition, the dense structure serves to connect the body layer and the gap layer to each other, thereby making it possible to decrease a risk of delamination between the body layer and the gap layer.

Further, the multilayer type power inductor according to the present invention having the above-mentioned structure may have the improved bias-TCL characteristics according to a temperature in a temperature range of −50 to 125□.

Furthermore, the porous structure of the gap layer serves as an air gap, thereby making it possible to improve the DC-bias characteristics of the power inductor. Even though the gap layer of the multilayer type power inductor according to the present invention has a thickness reduced by half, as compared to the gap layer made of non-magnetic material, for example, ZnCu ferrite according to the related art, the gap layer of the multilayer type power inductor according to the present invention shows the DC-bias characteristics similar to those of the gap layer made of the non-magnetic material, thereby making it possible to decrease the thickness of the chip.

What is claimed is:

1. A multilayer type power inductor, comprising:

a plurality of body layers including internal electrodes and having magnetic material layers stacked therein; and a plurality of gap layers, wherein the gap layers have an asymmetrical structure such that surfaces of the gap layers in contact with the plurality of body layers have a non-porous structure that is free of pores therein, and surfaces of the gap layers, which are not in contact with the plurality of body layers, have a porous structure.

2. The multilayer type power inductor according to claim 1, wherein the gap layers are non-magnetic material layers.

3. The multilayer type power inductor according to claim 1, wherein the non-porous structure in which the pores do not exist in the gap layers have a thickness of 0.1 to 3 μm.

4. The multilayer type power inductor according to claim 1, wherein the internal electrode includes at least one selected from the group consisting of Ag, Sn, Ni, Pt, Au, Cu, and an alloy thereof.

5. The multilayer type power inductor according to claim 1, wherein the body layer includes NiZnCu ferrite.

6. The multilayer type power inductor according to claim 5, wherein the body layer further contains at least one additive within 0.2 mol %, which is selected from the group consisting of $Bi_2O_3$, CoO, and $TiO_2$, based on 100 mol % of NiZnCu ferrite.

7. The multilayer type power inductor according to claim 1, wherein the gap layers include at least one non-magnetic material selected from the group consisting of tetravalent metal oxides.

8. The multilayer type power inductor according to claim 7, wherein the tetravalent metal is at least one selected from the group consisting of Ti, Zr, and Sn.

9. The multilayer type power inductor according to claim 7, wherein the gap layers further contain additives.

10. The multilayer type power inductor according to claim 9, wherein the additives include 0.001 to 0.05 mol % of CuO, 0.001 to 0.1 mol % of ZnO, 0.001 to 1 mol % of $Fe_2O_3$, and 0.001 to 0.01 mol % of $Bi_2O_3$ based on 100 mol % of the tetravalent metal oxide.

11. The multilayer type power inductor according to claim 1, wherein a change rate in inductance value is within 10% in a temperature range of −50 to 125° C. when there is no bias.

* * * * *